(12) United States Patent
Li et al.

(10) Patent No.: US 10,282,534 B2
(45) Date of Patent: May 7, 2019

(54) SYSTEM WITH PHYSICAL DATA AUTHORIZATION

(71) Applicant: ACCO Brands Corporation, Lake Zurich, IL (US)

(72) Inventors: Qiumin Li, Coquitlam (CA); Samson Lee, Vancouver (CA)

(73) Assignee: ACCO Brands Corporation, Lake Zurich, IL (US)

( * ) Notice: Subject to any disclaimer, the term of this patent is extended or adjusted under 35 U.S.C. 154(b) by 386 days.

(21) Appl. No.: 14/394,614

(22) PCT Filed: Mar. 14, 2014

(86) PCT No.: PCT/US2014/028974
§ 371 (c)(1),
(2) Date: Oct. 15, 2014

(87) PCT Pub. No.: WO2014/144524
PCT Pub. Date: Sep. 18, 2014

(65) Prior Publication Data
US 2015/0106920 A1    Apr. 16, 2015

Related U.S. Application Data

(60) Provisional application No. 61/940,556, filed on Feb. 17, 2014, provisional application No. 61/792,373, filed on Mar. 15, 2013.

(51) Int. Cl.
*G06F 21/34* (2013.01)
*H04L 29/08* (2006.01)
(Continued)

(52) U.S. Cl.
CPC ............ *G06F 21/34* (2013.01); *H02J 7/0004* (2013.01); *H04L 7/0004* (2013.01);
(Continued)

(58) Field of Classification Search
CPC ... H04W 12/06; H04W 52/0274; G06F 21/75; G06F 3/0486; H04L 51/10; H04L 65/601
(Continued)

(56) References Cited

U.S. PATENT DOCUMENTS

| 2002/0038394 | A1* | 3/2002 | Liang | G06F 1/266 |
| | | | | 710/62 |
| 2005/0188425 | A1* | 8/2005 | Horn | H04L 63/0853 |
| | | | | 726/34 |

(Continued)

FOREIGN PATENT DOCUMENTS

EP    2073128 A1    6/2009

OTHER PUBLICATIONS

International Search Report and Written Opinion for Application No. PCT/US2014/028974 dated Aug. 22, 2014 (9 pages).
(Continued)

*Primary Examiner* — Evans Desrosiers
(74) *Attorney, Agent, or Firm* — Michael Best & Friedrich LLP

(57) ABSTRACT

A system for enabling data syncing between a host device and an electronic device includes a first port configured to be coupled to a first electronic device, a second port configured to be coupled to the host device, and a data sync switch coupled to the first port and the second port. The data sync switch is switchable between a first state, in which data communication between the electronic device and the host device is enabled, and a second state, in which data communication between the electronic device and the host device is disabled. The system also includes an authorization device configured to couple to an authorizing physical object and generate an output signal. The data sync switch is in one of the first state and the second state based on the output signal from the authorization device.

18 Claims, 10 Drawing Sheets

(51) Int. Cl.
*H04L 7/00* (2006.01)
*H04L 29/06* (2006.01)
*H02J 7/00* (2006.01)
*G06F 13/40* (2006.01)

(52) U.S. Cl.
CPC ...... *H04L 63/0853* (2013.01); *H04L 67/1095* (2013.01); *G06F 13/4068* (2013.01); *H02J 2007/006* (2013.01)

(58) Field of Classification Search
USPC ......... 713/168–174, 182–186, 202; 709/206, 709/225, 229, 249, 389; 726/2–8, 20
See application file for complete search history.

(56) References Cited

U.S. PATENT DOCUMENTS

| | | |
|---|---|---|
| 2006/0190653 A1 | 8/2006 | Wahler et al. |
| 2008/0082699 A1* | 4/2008 | Alrod .................... G06F 3/0605 710/2 |
| 2009/0005005 A1 | 1/2009 | Forstall et al. |
| 2011/0136541 A1* | 6/2011 | Chang ............... H04M 1/72527 455/558 |

OTHER PUBLICATIONS

Extended European Search Report from the European Patent Office for Application No. 14763688.0 dated Mar. 22, 2016 (7 pages).

* cited by examiner

SYSTEM WITH PHYSICAL DATA AUTHORIZATION

RELATED APPLICATIONS

This application claims to the benefit of U.S. Provisional Application 61/940,556, filed on Feb. 17, 2014, and U.S. Provisional Application 61/792,373, filed on Mar. 15, 2013, the entire contents of both of which are incorporated herein by reference.

BACKGROUND

Various electronic devices—including cellular phones, portable computers, MP3 players, personal digital assistants (PDAs), etc.—require frequent data synchronization and recharging. The present invention relates to systems and methods providing for data synchronization and recharging.

SUMMARY

For portable electronic devices, a common physical medium (e.g. a cable) can be used for both charging and data synchronization functions. In situations where only one of the two functions is desired, a "charge-only cable" or a "data-only" cable may be used. To enable or disable synchronization a cable has to be swapped in or out. However, there are cases in which data synchronization needs to be controlled without affecting the charging cycle. In such situations, it may not be feasible to remove a "charge-only" cable and replace it with a cable that provides for both charging and data synchronization.

The methods and systems described below allow enablement and disablement of data synchronization between a host and one or more mobile devices. Furthermore, methods and systems described below provide for secure access to data synchronization features by using a physical hardware device (e.g., a "key") carried by a user or coupled to the data synchronization system. By utilizing a physical hardware device instead of a password or an electronic encryption key to control access to data synchronization functionality, such constructions are not subject to weak passwords or encryption algorithms. Some constructions described below also include a hardware switch that is configured to control data synchronization access by physically breaking the data connection between the electronic device and the host device.

In one embodiment, the invention provides a system for enabling data syncing between a host device and an electronic device. The data syncing system includes a first port coupleable to a first electronic device, a second port coupleable to the host device, and a data sync switch coupled between the first port and the second port. The data sync switch is switchable between a first state, in which the data sync switch enables data communication between the host device and the electronic device, and a second state, in which data communication between the electronic device and the host device is disabled. The state of the data sync switch is governed by an authorization device that is coupleable to an authorizing physical object. Based on an output signal from the authorization device, the data sync switch is placed in the first state when the authorizing physical object is detected by the authorizing device and the data sync switch is placed in the second state when the authorizing physical object is not detected by the authorizing device.

Other aspects of the invention will become apparent by consideration of the detailed description and accompanying drawings.

DETAILED DESCRIPTION

Before any examples of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
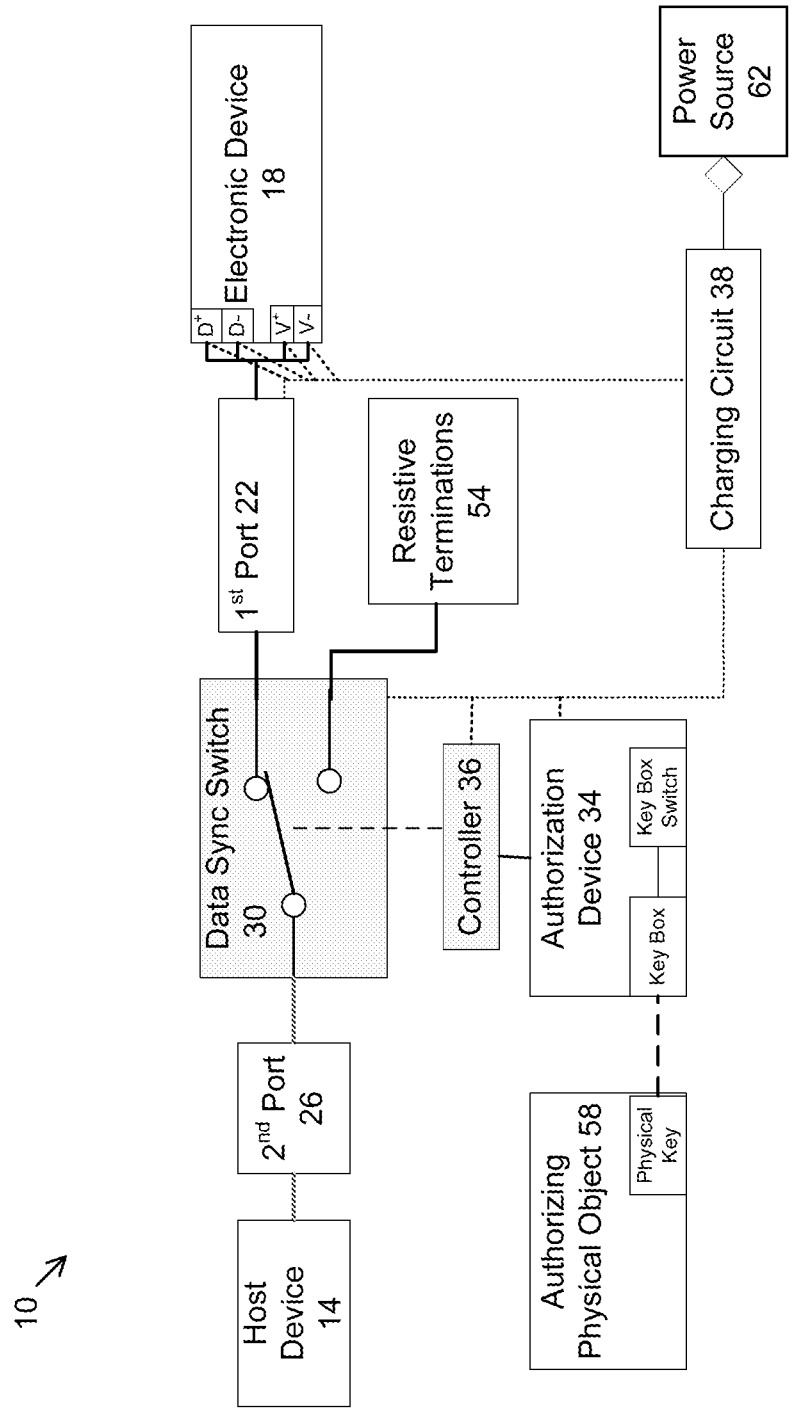
FIG. 1 is a schematic diagram of a data syncing system with a data sync switch in a first state.

FIG. 1 shows a data syncing system 10 for enabling data communication between a host device 14 and an electronic device 18. The data syncing system 10 utilizes a physical object to physically create (or break) a data communication link between the host device 14 and the electronic device 18. The data syncing system 10 does not require a password or an encryption key to gain access to data saved in the host device 14 or in the electronic device 18. Thus, the data syncing system 10 is not subject to weak passwords or encryption algorithms. The data syncing system 10 is also configured to charge the electronic devices 18. However, other constructions may be configured to provide only data synchronization functionality without charging the connected electronic devices 18.

The portable electronic device 18 may be, for example, a laptop computer, a tablet computer, a smartphone, a cellphone, a hard drive array, or another type of electronic storage. In some constructions, the portable electronic device 18 may be an IPAD tablet computer sold by Apple, Inc. In other constructions, other types of portable electronic devices that are capable of data communication may be connected to the system 10. The electronic device 18 can include a USB port, a micro USB port, or another suitable data port and/or power port to connect the device 18 to the data syncing system 10.

The host device 14 may be, for example, a laptop computer, a tablet computer, a smartphone, a cellphone, or a two-way radio. The host device 14 can include a USB port, a micro USB port, or another suitable data port and/or power port to connect the host device 14 to the data syncing system 10.

The system 10 is configured to selectively create an electrical communication link between the host device 14 and the electronic device 18. As illustrated, the data syncing system 10 includes a first port 22, a second port 26, a data sync switch 30, an authorization device 34, a controller 36, and a charging circuit 38. The first port 22 is coupled to the data sync switch 30 and configured to be coupled to the electronic device 18. In the construction of FIG. 1, the first port 22 is a USB port configured to be coupled to a port of the electronic device 18 by a cable. In other constructions, the first port 22 may be plugged directly into the port of the electronic device 18 without a cable. The first USB port 22 includes a set of power terminals (V+ and V−) and a set of data terminals (D+ and D−). The power terminals include a Vbus terminal V+ and a ground or reference terminal V−. The electronic device 18 receives charging power through the power terminals. The power terminals V+, V− are coupled to the charging circuit 38. The set of data terminals includes a D+ terminal and a D− terminal. The data terminals D+, D− are coupled to the data sync switch 30 to provide for communication with the host device 14 (depending on the state of the data sync switch as discussed below). In some constructions, the data terminals D+, D− are also coupled to the charging circuit 38 to help ensure that the charging circuit 38 is recognized as a suitable charging circuit by the electronic device 18.

The second port 26 is coupled to the data sync switch 30 and configured to be coupled to the electronic device 18. The second port 26 is a USB port configured to be coupled to a port of the host device 14 by a cable. However, in other constructions, the second port 26 may be plugged directly into the port of the host device 14 without a cable. The second USB port 26 includes a set of power terminals and a set of data terminals. The data terminals include a D+ terminal and a D− terminal. The data terminals D+, D− of the second port 26 are coupled to the data sync switch 30 to selectively communicate with the electronic device 18 depending on the state of the data sync switch 30.

The data sync switch 30 is coupled between the first port 22 and the second port 26. The data sync switch 30 is also coupled to the authorization device 34. The data sync switch 30 is configured to switch between a first state and a second state based on an output signal from the authorization device 34. As shown in FIG. 1, when the data sync switch 30 is in the first state, data communication between the host device 14 and the electronic device 18 is enabled by the data sync switch 30. In the first state (FIG. 1), the data sync switch 30 creates an electrical communication link between the host device 14 and the electronic device 18 by electrically connecting the data terminals D+, D− of the second port 26 with the data terminals D+, D− of the first port 22.

Figure 2:
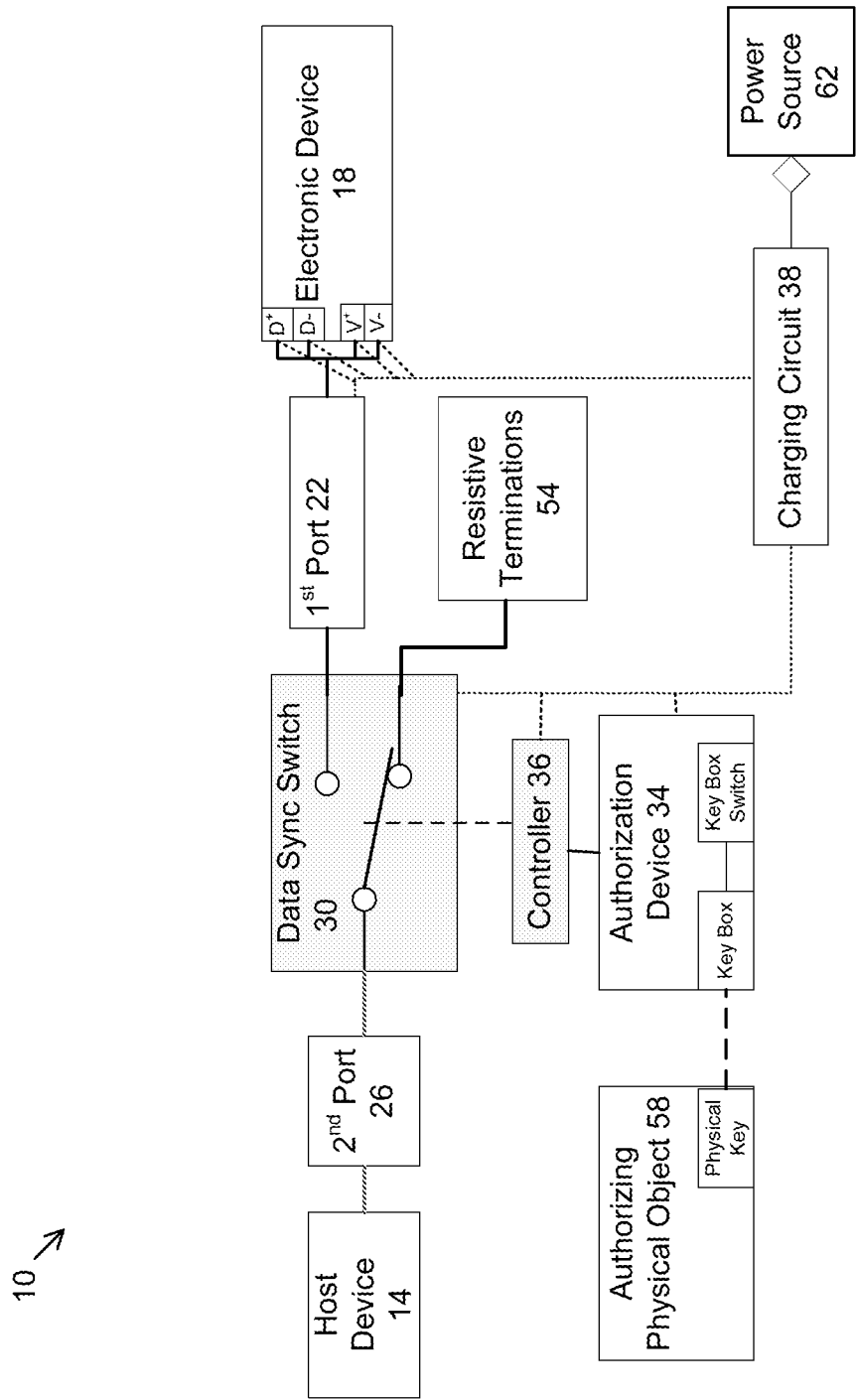
FIG. 2 is a schematic diagram of the data syncing system of FIG. 1 with the data sync switch in a second state.

FIG. 2 shows the same data syncing system. However, in the example of FIG. 2, the data sync switch 30 is in the second state and data communication between the host device 14 and the electronic device 18 is disabled. In the second state (FIG. 2), the data sync switch 30 physically breaks the electrical connection between the data terminals D+, D− of the second port 26 and the data terminals D+, D− of the first port 22 and, instead, connects the data terminals D+, D− of the second port 26 to a set of resistive terminations 54. In other constructions, the data sync switch 30 connects the data terminals D+, D− of the first port 22 to the set of resistive terminations 54 when in the second state. In still other constructions, the data terminals D+, D− of the first port 22 and the data terminals D+, D− of the second port 26 are each connected to a different set of resistive terminations when the data sync switch 30 is in the second state.

In the example of FIGS. 1 and 2, the data sync switch 30 is implemented with a multiplexer. The multiplexer receives a control signal, for example, from the controller 36, that determines which data lines (e.g., the data terminals D+, D− from the first port 22 or the resistive terminations 54) connect to the second port 26. In other constructions, the data sync switch 30 is implemented using different hardware components. For example, the data sync switch 30 may be implemented using a relay, a transistor network, and/or a logic gate network.

The data sync switch 30 is held in one of the first state and the second state based on the output signal from the authorization device 34. The authorization device 34 is coupled to the controller 36 and configured to couple to an authorizing physical object 58. The authorization device 34 generates an output signal indicating whether the authorization device 34 is coupled to the authorizing physical object 58. When the authorizing physical object 58 couples with the authorization device 34, the authorization device 34 generates a first output signal indicating that the authorizing physical object 58 and the authorization device 34 have successfully coupled. When the authorization device 34 does not couple with the authorizing physical object 58, for example, because the authorization device 34 couples with a different physical object that is not the authorizing physical object 58 or because the authorization device 34 is not coupled to any physical object, the authorization device 34 generates a second output signal indicating that the authorization device 34 is not coupled to the authorizing physical object 58.

The controller 36 receives the signal from the authorization device 34 and generates a first control signal to hold the data sync switch 30 in either the first state or the second state based on the output signal from the authorization device. Thus, the data sync switch 30 creates an electronic communication link between the host device 14 and the electronic device 18 when the authorization device 34 is successfully coupled with the authorizing physical object 58. If, on the other hand, the authorization device 34 does not couple with the authorizing physical object 58 data communication between the host device 14 and the electronic device 18 is disabled. The controller 36 may include a processor having for example, an analog-to-digital converter and a non-transitory memory. The memory of the controller 36 may store instructions to be executed by the processor. For example, the memory of the controller 36 may store the output from the authorization device 34 that indicates that the authorizing physical object 58 is coupled to the authorization device 34. The processor may then receive and output different types of information to the other components of the data syncing system 10. In other constructions, the controller 36 may include a comparator to compare the output signal from the authorization deice 34 to a predetermined signal to determine if the authorizing physical object 58 is coupled to the authorization device 34.

The controller 36 is also configured to determine when the host device 14 and the electronic device 18 are connected to the data syncing system 10. Once the controller 36 sends the control signal to the data sync switch 30 to be in the first state, the controller 36 periodically checks if the host device 14 and the electronic device 18 remain coupled to the data syncing system 10. If at any point during data synchronization the host device 14 or the electronic device 18 are disconnected from the data syncing system 10, the controller 36 then checks if the authorizing physical object 58 is still coupled to the authorization device 34. Thus, once data synchronization begins between the host device 14 and the electronic device 18, even if the authorizing object 58 does not remain coupled to the authorization device 34, data synchronization continues until one of the electronic device 18 and the host device 14 is disconnected from the data syncing system 10. In other words, the authorizing object 58 enables data synchronization to begin, and the connection of the host device 14 and the electronic device 18 maintain data synchronization active. Once data synchronization stops because either the host device 14 or the electronic device 18 are disconnected from the data syncing system 10, the authorizing object 58 is recoupled to the authorization device 34 to authorize a new data syncing cycle with the same or different host device 14 or electronic device 18.

The authorization device 34 may take on different forms and, therefore, interface with different hardware constructions of the specific authorizing physical object 58. In the example of FIG. 1, the authorization device 34 includes a key box, and the authorizing physical object 58 is in the form of a physical key. The key box is configured to receive the physical key and turn when the physical key is the authorizing physical object 58 (e.g., when the key is the correct key for the specific system). The key box includes a key box switch that is switchable between an open state and a closed state. The key box switch generates an output signal indicative of whether the correct key (i.e., the authorizing physical object 58) is inserted and turned in the key box. When the correct key is used, the key box switch within the key box changes states and generates an output signal indicating that the authorization device 34 is coupled to the authorizing physical object 58. The controller 36 receives the output signal from the authorization device 34 (e.g., the key box switch) and outputs a control signal to the data sync switch 30 to enable data communication between the host device 14 and the electronic device 18. When key box does not receive the right key, and thus, does not turn, the key box switch does not change states and the data sync switch 30 is held in the second state to inhibit data communication between the host device 14 and the electronic device 18.

In other constructions, the authorization device 34 couples directly to the data sync switch 30 and generates the control signal to hold the data sync switch 30 in one of the first state and the second state based on if the authorization device 34 is coupled to the authorizing physical object 58. In still other constructions, the key box configuration described above can take the place of the data sync switch 30 itself. In such constructions, the key box remains in the first state when the key is not inserted and turned. When in the first state, the electrical connection between the first port 22 and the second port 26 is physically broken (i.e., an open circuit condition). When the appropriate key (i.e., the authorizing physical object 58) is inserted into the key box and turned, the switch inside the key box is mechanically closed and the physical connection between the first port 22 and the second port 26 is reestablished.

The charging circuit 38 is coupled to a power source 61 and to the first port 22. The charging circuit 38 is configured to control a charging current provided to the electronic device 18 via the first port 22. In the example of FIG. 1, the power source 61 is an AC power source. Accordingly, the charging circuit 38 includes components necessary to provide an appropriate charging current to the electronic device 18. For example, the charging circuit 38 includes an AC-to-DC converter, a DC-to-DC converter, a charging current control circuit, and protection circuitry. As shown in FIGS. 1-2, the charging circuit 38 is coupled to the power terminals V+, V− of the first port 22 to thereby provide a charging current to the electronic device 18. In some constructions, such as the one illustrated in FIGS. 1 and 2, the components of the charging circuit 38 may also be coupled to the authorization device 34 to power the authorization device 34 and/or to the controller 36. In some constructions, the controller 36 also controls some or all of the functions of the charging circuit 38. Similarly, components of the charging circuit 38 may be coupled to the data sync switch 30 to power the data sync switch 30.

Figure 3:
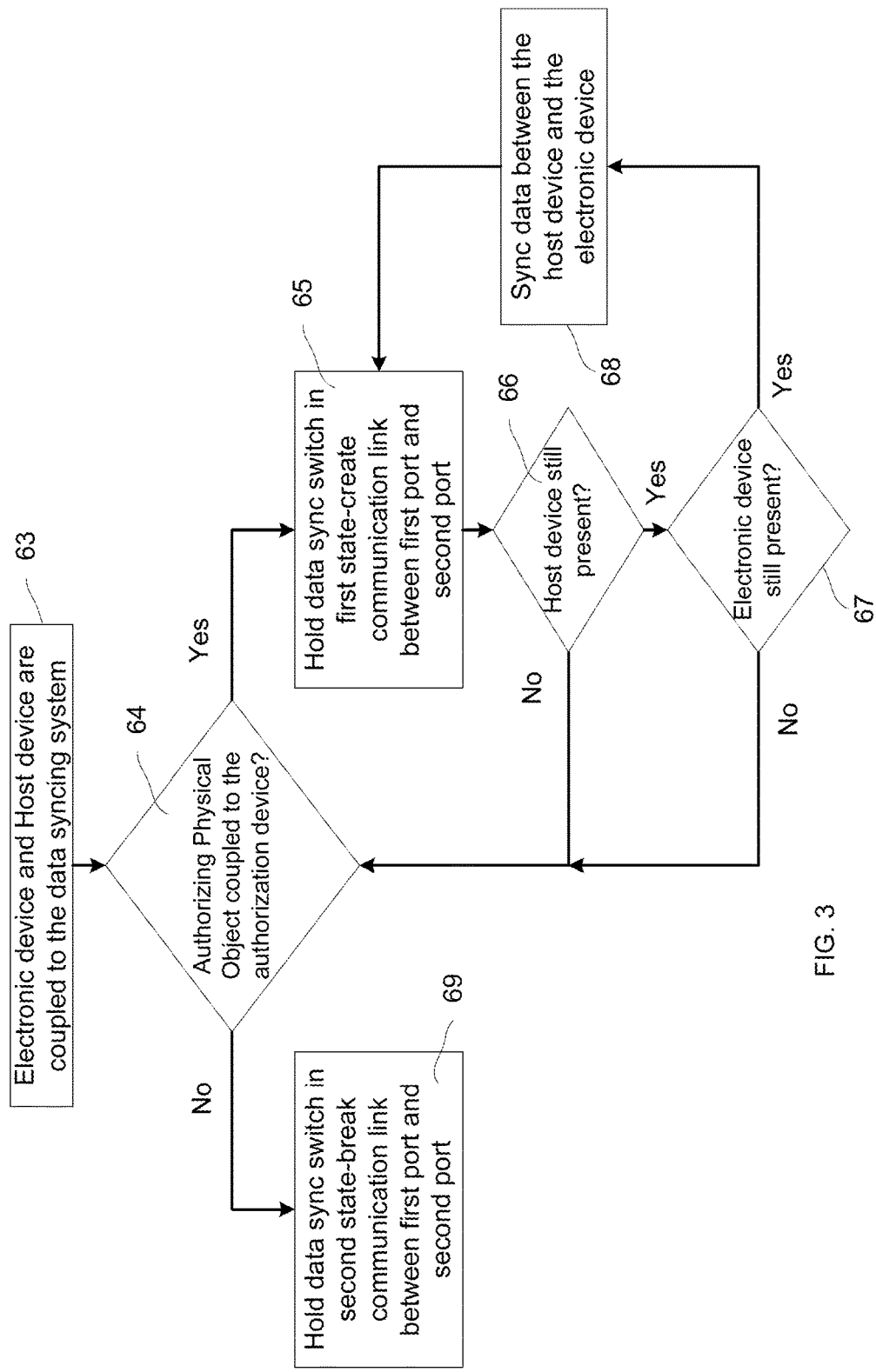
FIG. 3 is a flowchart of an operation of the authorization device of the data syncing system of FIG. 1

The flowchart of FIG. 3 illustrates the authorization provided by the authorizing physical object 58 to enable data communication between the host device 14 and the electronic device 18. In step 63, the data sync switch 30 is in the second state when the electronic device 18 and the host device are coupled to the data syncing system 10. The controller 36 then checks if the authorization device 34 is coupled to the authorizing physical object 58 at step 64. If the controller 36 determines that the authorization device 34 is coupled with the authorizing physical object 58, the controller 36 sends a control signal to the data sync switch 30 to switch to the first state and thereby create a communication link between the first port 22 and the second port 26 at step 65. During data synchronization, the controller 36 then checks if the host device 14 is still connected to the data syncing system 10 at step 66. If the controller 36 determines that the host device 14 is no longer connected to the data syncing system 10, the controller 36 returns to step 64 to check if the authorizing physical object 58 is coupled to the authorization device 34. If the controller 36 determines that the host device 14 is still connected to the data syncing system 10, the controller 36 proceeds to check if the electronic device 18 is connected to the data syncing system 10 at step 67. If the controller 36 determines that the electronic device 18 is also connected to the data syncing system 10, the electronic device 18 and the host device 14 then proceed to sync data at step 68.

If the controller 36 determines that the electronic device 18 is no longer connected to the data syncing system 10, the controller 36 returns to step 64 and checks if the authorizing physical object 58 is coupled to the authorization device 34. If the controller 36 determines that the authorization device 34 is not coupled with the authorizing physical object 58, the controller 36 sends a control signal to the data sync switch 30 to be in the second state and thereby physically break the communication link between the first port 22 and the second port 26 at step 69.

Figure 4:
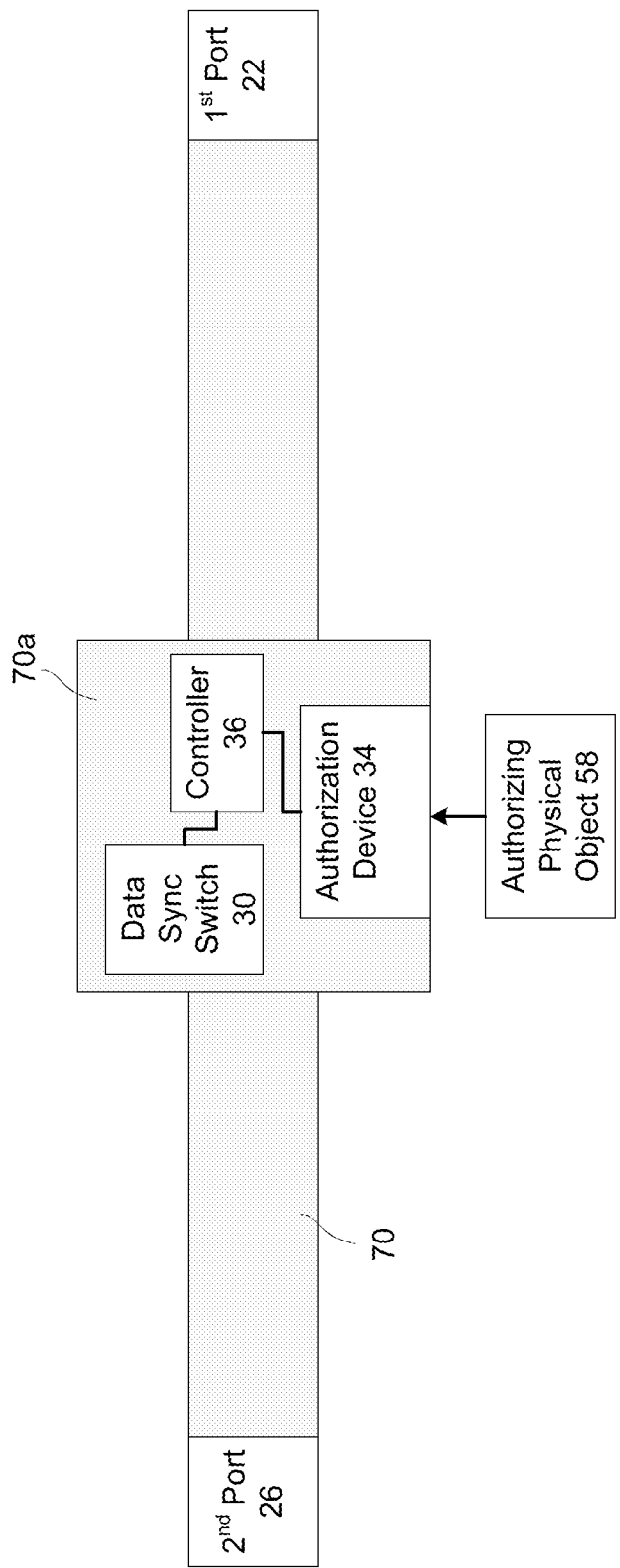
FIG. 4 is schematic diagram of a cable including the data syncing system of FIG. 1

The cable of FIG. 4 illustrates the data syncing system 10 implemented in the form of a cable. As illustrated in FIG. 4 the cable 70 includes the first port 22 coupleable to the electronic device 18, and the second port coupleable to the host device 14. The cable includes the authorization device 34, the controller 36, and the data sync switch 30 in a housing 70*a*. The housing 70*a* includes the key box as described with reference to FIGS. 1 and 2. The cable 70 of the example of FIG. 4 may be used to replace conventional charging or data syncing cables to provide physical control of the data communication link between the host device 14 and the electronic device 18. The authorization device 34 may include other hardware forms in place of or in addition to the key box as described for this example.

Figure 5:
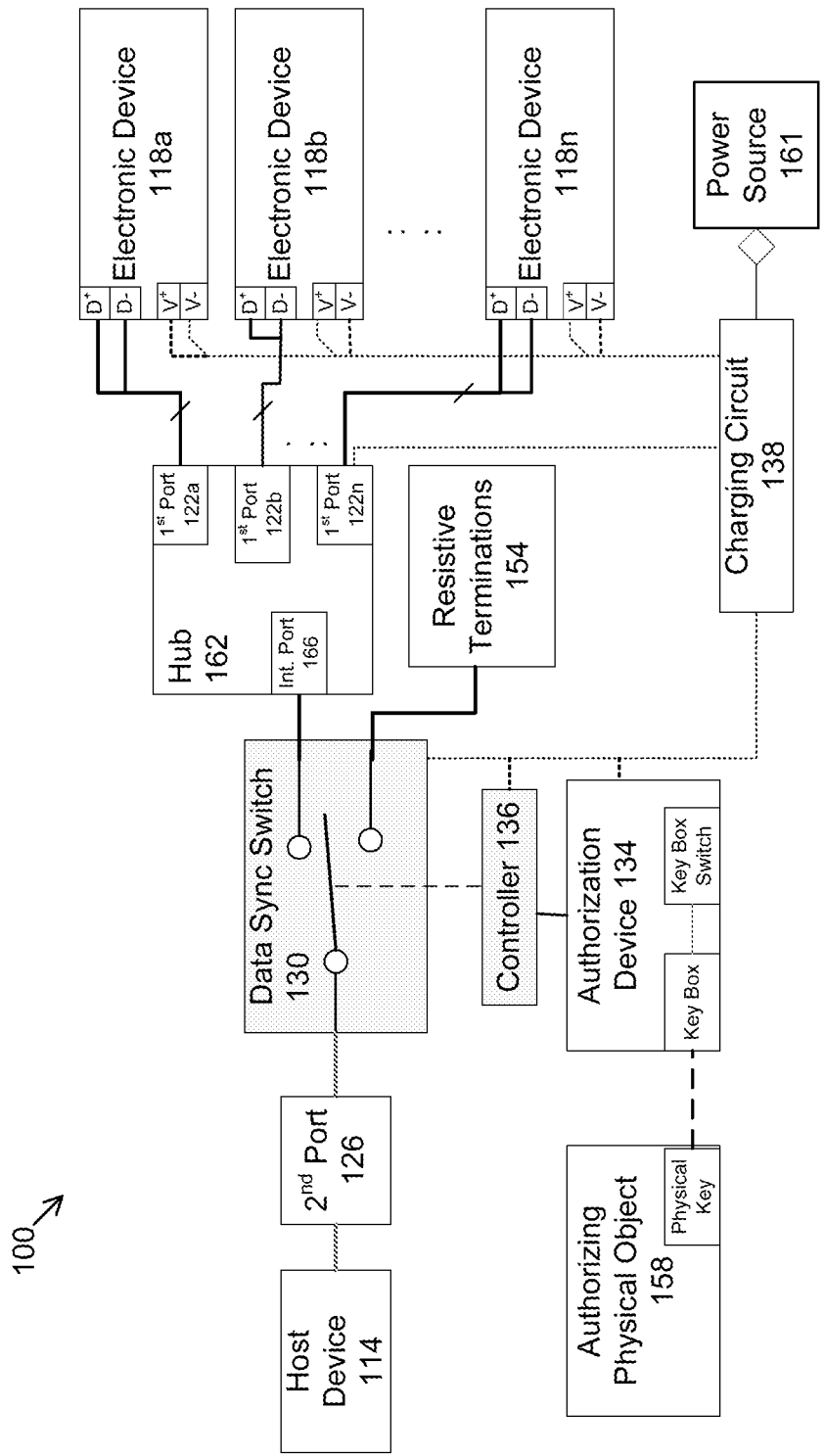
FIG. 5 is a schematic diagram of a data syncing system with a plurality of ports connectable to a plurality of electronic devices.

Although the example of FIG. 1 shows a device for establishing (and breaking) a data link between a host computer and a single electronic device, in some other constructions, the data syncing system 10 may be integrated as a part of a cabinet or other structure that is designed to receive and store a plurality of electronic devices 18 simultaneously. FIG. 5 illustrates an example of one such data syncing system 100 that is used to control data communication between a host device 14 and a plurality of electronic devices 18a-n. The data syncing system 100 includes similar components to the data syncing system 10 and like parts have been given like reference numbers plus 100.

The data syncing system 100 of FIG. 5 includes a plurality of first ports 122a-n, a USB hub 162, and a single data sync switch 130. As described earlier with respect to the first port 22, the plurality of first ports 122a-n are configured to couple to a plurality of electronic devices 118a-n. The USB hub 162 serves as an intermediary node between the plurality of first ports 122a-n and the second port 126 to simplify data communication between the host device 114 and the plurality of electronic devices 118a-n. The USB hub 162 is coupled to the plurality of first ports 122a-n and is coupled to the data sync switch 130 through an intermediary port 166. The USB hub 162 connects each of the plurality of first ports 122a-n to the data sync switch 130 through the intermediary port 166. Thus, in the example of FIG. 5, the plurality of first ports 22a-n are coupled to the second port 26 through the USB hub 162. When data communication between the host device 114 and the plurality of electronic devices 118a-n is enabled by the authorization device 134 as described for the data syncing system 10, the data sync switch 130 creates an electronic communication link between the host device 114 and the intermediary port 166. The intermediary port 166 then shares all of the data from the host device 114 with each of the plurality of first ports 122a-n. The intermediary port 166 also shares the data from any of the plurality of first ports 122a-n with the host device 114.

In the example of FIG. 5, the data sync switch 130 is coupled to the USB hub 162 and the second port 126. Similar to the functionality of the data sync switch 30 of the data syncing system 10, when the data sync switch 130 is in the first state, the second port 126 is coupled to the USB hub 162 and when the data sync switch 130 is in the second state, the second port 126 is coupled to resistive terminations 154. Thus, in the second state the plurality of first ports 122a-n is disconnected from the second port 126 because the second port 126 is disconnected from the USB hub 162. Therefore, the single data sync switch 130 controls data communication between the host device 114 and all of the electronic devices 118a-n. Other operations of the data syncing system 100 to charge and sync the electronic devices 118a-n are substantially the same as the data syncing system 10 discussed above.

Figure 6:
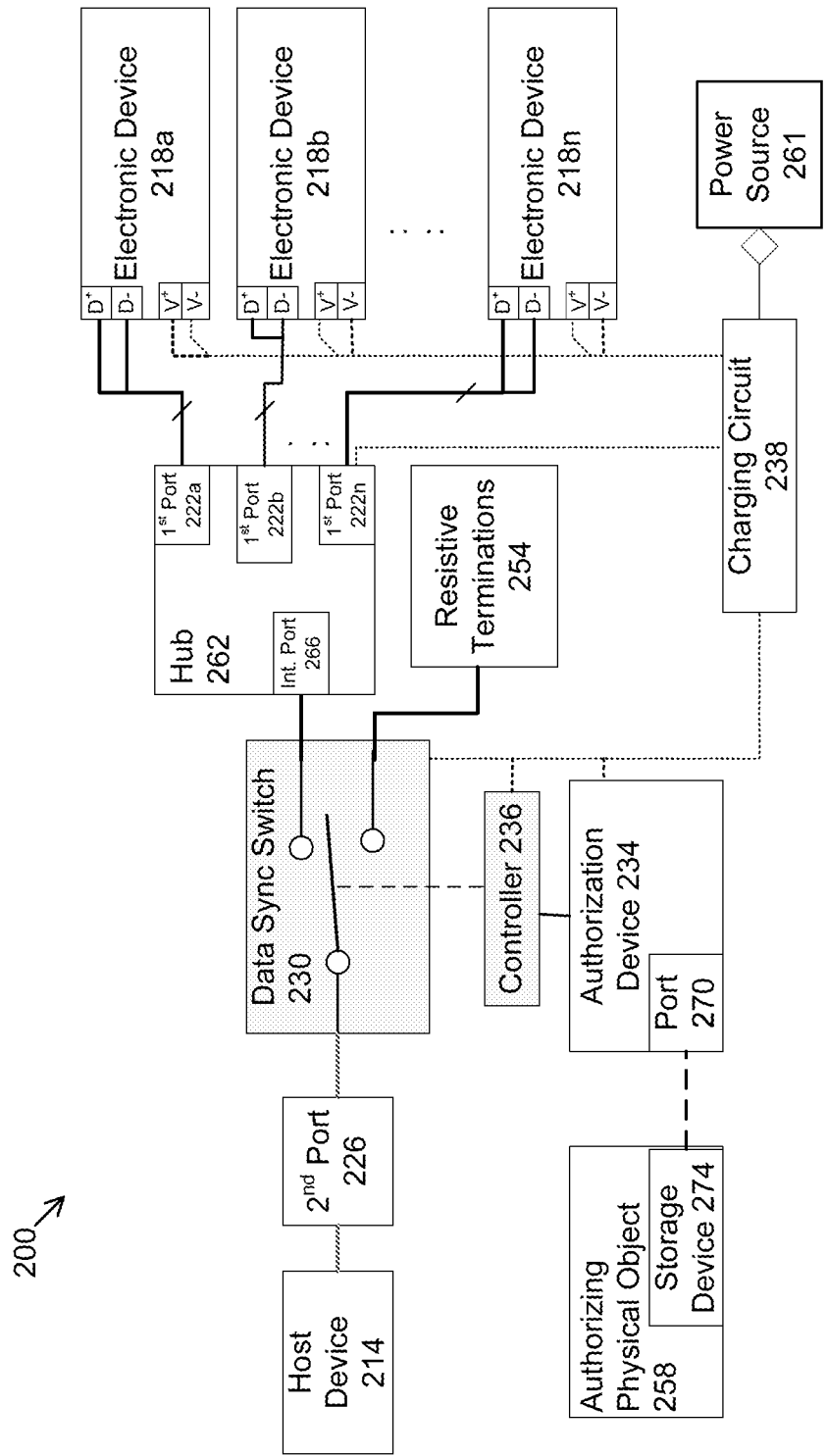
FIG. 6 is a schematic diagram of a data syncing system that accepts an authorizing physical object that includes an electronic key stored on a storage device.

As noted above, the authorizing physical object 58 can be implemented in a number of different hardware forms. Although the examples discussed above refer to using a physical key as the authorizing physical object, other hardware components can be utilized. For example, FIG. 6 illustrates a data syncing system 200 that includes similar components to the data syncing system 100 and like parts have been given like reference numbers plus 200. However, the authorization device 234 of the data syncing system 200 does not include a key box, a key box switch, or a physical key. Rather, the authorization device 234 of the data syncing system 200 includes a USB port 270. The USB port 270 may include a set of power terminals (V+, V−) and a set of data terminals (D+, D−). The USB port 270 is configured to receive a USB data storage device. The authorizing physical object 258 includes a USB data storages device 274 that includes a digital key. The digital key may be in the form of a specific voltage applied to the data terminals D+, D− of the USB port 270. In other constructions the digital key may be in the form of a code or other signal. In yet other constructions, the digital key may include identification information for the USB storage device 274, such as, for example, an identification or serial number. When the authorizing physical object 258 couples to the USB port 270, the digital key from the USB data storage device 274 is sent to the controller 236. The controller 236 compares the digital key from the USB storage device 274 coupled to the USB port 270 to a previously stored digital key. If the digital key from the USB storage device 274 corresponds to the digital key previously stored in the controller 236, the controller 236 generates a control signal to hold the data sync switch 230 in the first state to enable data communication between the host device 214 and the electronic devices 218a-n. If the digital key from the USB storage device 274 does not correspond to the digital key previously stored in the controller 236, the controller 236 generates a control signal to hold the data sync switch 230 in the second state to disable data communication between the host device 214 and the electronic devices 218a-n. In the example of FIG. 6, the data sync switch 230 is coupled directly to the second port 226 and to the USB hub 262. Other operations of the data syncing system 200 to charge and sync the electronic devices 218a-n are substantially the same as the data syncing system 100 discussed above.

Figure 7:
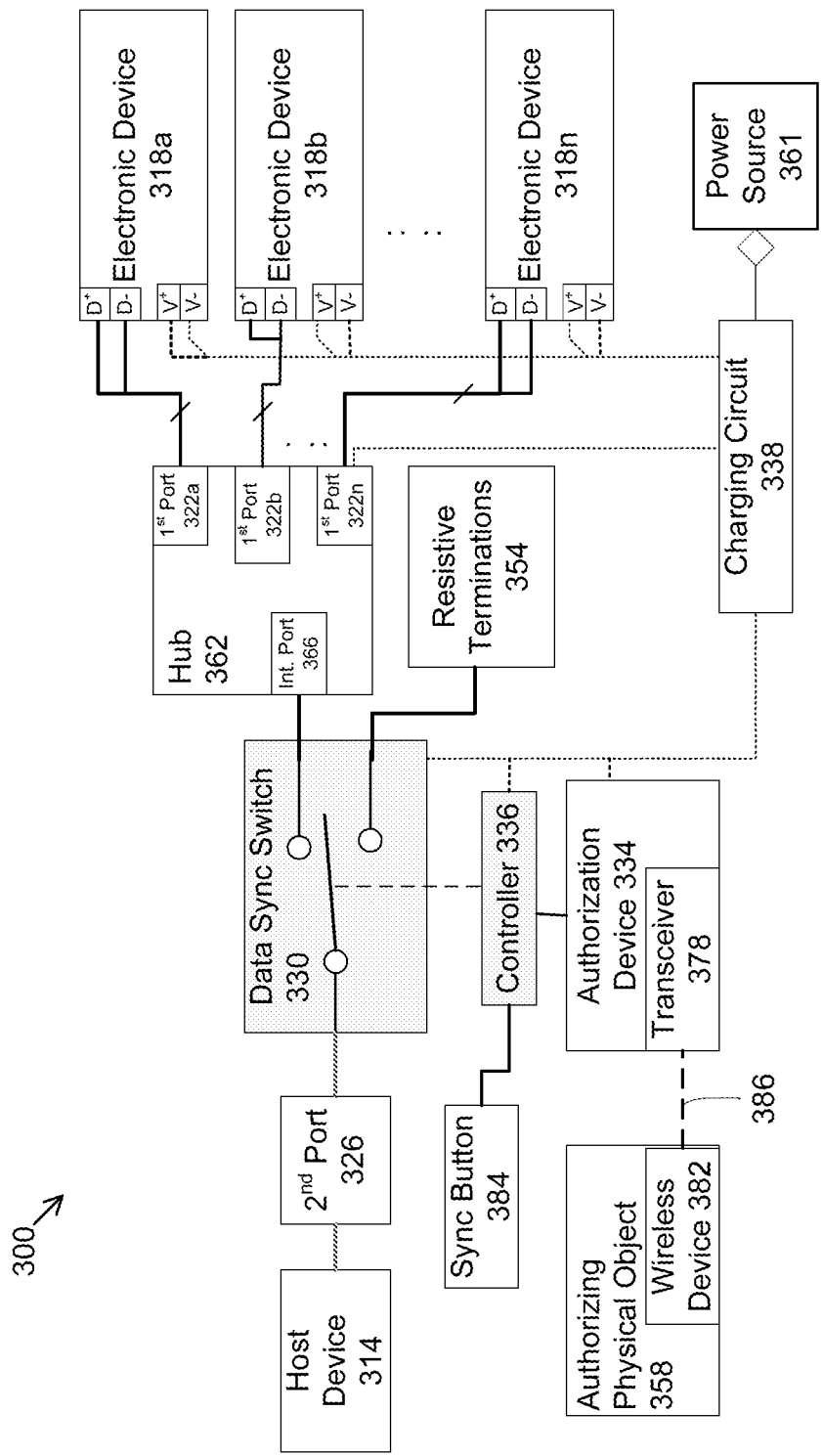
FIG. 7 is a schematic diagram of a data syncing system that couples with an authorizing physical object that includes a wireless device.

FIG. 7 illustrates a data syncing system 300 that includes similar components to the data syncing system 100 and like parts have been like reference numbers plus 300. The authorization device 334 of the data syncing system 300 includes a wireless transceiver 378. The wireless transceiver 378 is configured to couple to a wireless device 382. The authorizing physical object 358 includes the wireless device 382 that communicates with the wireless transceiver 378 of the data syncing system 300 over a secured channel 386 and sends the appropriate digital key to the wireless transceiver 378. The wireless transceiver 378 may be pre-programmed to communicate with specific wireless devices over the secured channel 386. The secured channel 386 may, for example, be over a particular frequency, such that both the wireless transceiver 378 and the wireless device 382 communicate over the same frequency. The wireless device 382 communicates with the wireless transceiver 378 using short-range wireless signals and any suitable protocol such as Bluetooth®. When the wireless device 382 comes in close proximity to the wireless transceiver 378, the wireless device 382 sends a wireless signal including a digital key to the wireless transceiver 378. The wireless transceiver 378 receives the wireless signal—and thus the digital key—from the wireless device 382 and sends the digital key to the controller 336. In some constructions, the digital key may include a wireless device 382 identification number, code, or another identification information for the wireless device 382. In other constructions, the digital key includes a signal unrelated to the identity of the wireless device 382.

The controller 336 determines if the digital key received from the wireless device 382 corresponds to a previously stored digital key. In the example where the digital key includes device identification information, the controller 336 determines if the device identification information is included in a stored list of device identification numbers associated with authorized wireless devices. If the digital key from the wireless device 382 corresponds to the previously stored digital key, the controller 336 generates a control signal to hold the data link switch 330 in the first state to enable data communication between the host device 314 and the electronic devices 318a-n. If the digital key from the wireless device 382 does not correspond to the previously stored digital key, the controller 336 generates a control signal to hold the data sync switch 330 in the second state and thereby disable data communication between the host device 314 and the electronic devices 318a-n.

In the example of FIG. 7, the data syncing system 300 also includes a sync button 384. The sync button 384 is coupled to the controller 336 and is switchable between an open state and a closed state. The sync button 384 holds the data sync switch 330 in its present state. The sync button 384 is used such that the authorizing physical object 58 does not need to remain coupled to the authorization device 34 for the entire duration of data synchronization. In other words, the sync button 384 is implemented such that the wireless device 382 does not need to stay in close proximity to the wireless transceiver 378 until the electronic devices 318a-n finish syncing. Rather, the wireless device 382 comes in close proximity to the wireless transceiver 378 once, the data sync switch 330 is set to the first state to enable data communication, and the sync button 384 is pressed. Since the sync button 384 is pressed, removal of the wireless device 382 does not disable data communication. Data communication is disabled when the sync button 384 is pressed and the data sync switch 30 switches states. The wireless device 382 then comes in close proximity to the wireless transceiver 378 to enable data communication again. The sync button 384 may be included in any of the data syncing systems described in the present application including any other type of authorizing object. The sync button 384 provides a way for the controller 336 to hold the data sync switch 330 in the first state without needing to periodically check for the presence of the host device 314 and/or the electronic device 318a-n. Rather, the controller 336 just checks if the authorizing object 358 is coupled to the authorization device 334 and if the sync button is pressed.

In some constructions, the wireless device 382 may include a mobile communication device, such as, for example a smartphone. The mobile communication device may be programmed to communicate with the wireless transceiver 378 and may also send the digital key to the controller 336. In some constructions, the wireless transceiver 378 is part of an object tracking system that is managed through the mobile communication device. In such constructions, the wireless transceiver 378 couples to the mobile communication device by a pairing and authentication protocol. The mobile communication device may communicate instructions to the wireless transceiver 378 to be executed by the controller 336. For example, the mobile communication device may communicate instructions for the controller 336 to hold the data sync switch 330 in the first state to enable data communication between the host device 314 and the electronic devices 318a-n.

Figure 8:
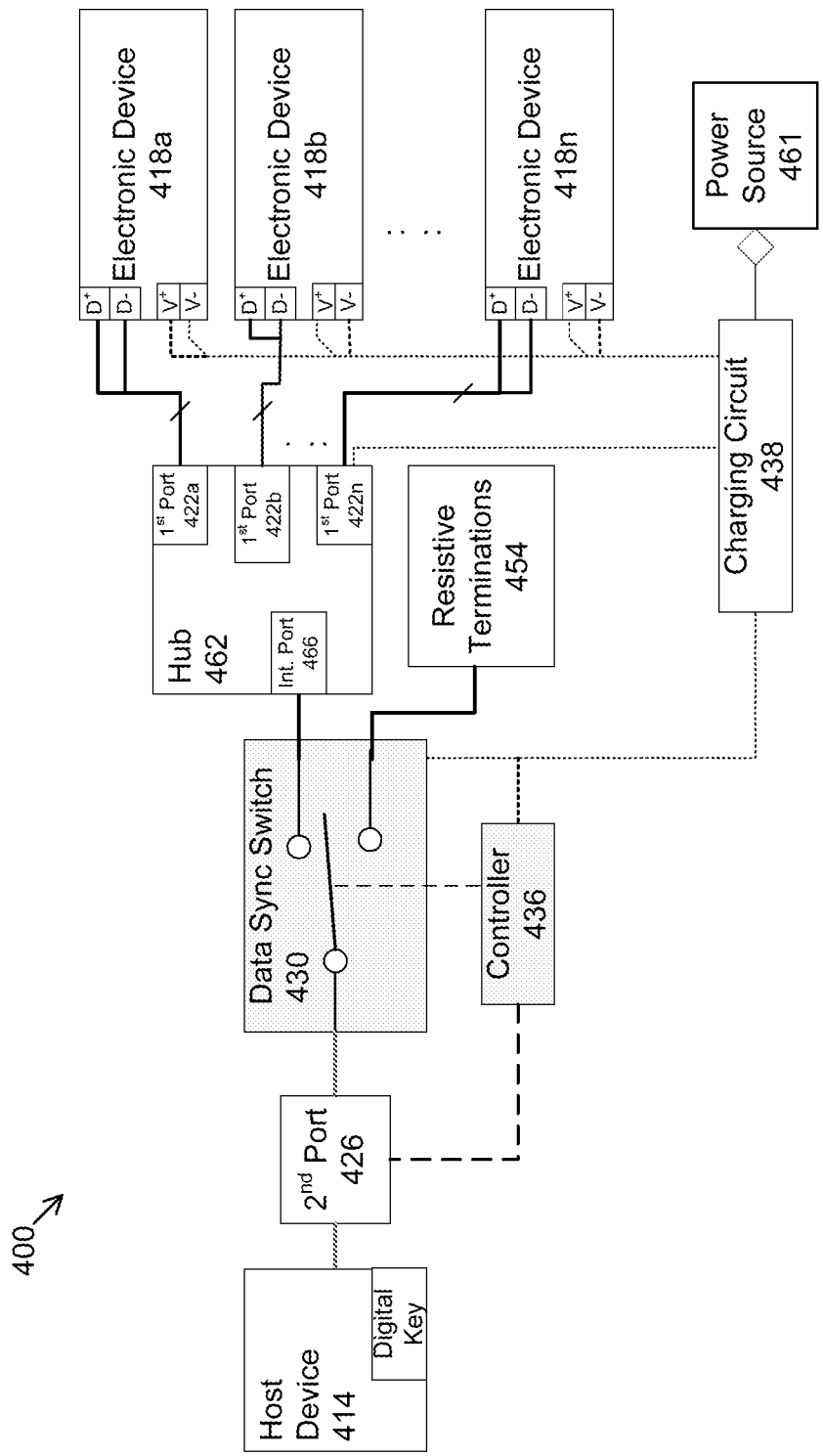
FIG. 8 is a schematic diagram of a data syncing system that receives a digital key from a host device.

FIG. 8 illustrates a data syncing system 400 that includes similar components to the data syncing system 100 and like parts have been like reference numbers plus 400. The authorizing physical object 458 of the data syncing system 400 includes the host device 414 itself. In this construction, the host device 414 includes software that recognizes the connection to the data syncing system 400 and outputs a digital key via the USB data terminals to the second port 426. In the example of FIG. 8, the second port 426 operates as the authorization device, such that a single physical structure carries out the functions associated with the second port 426 (e.g., data communication with the electronic devices 418a-n) and the functions associated with the authorization device (e.g., provide a physical structure for receiving the authorizing physical object). The second port 426 then receives the digital key through the data terminals D+, D− and sends the digital key to the controller 436. The controller 436 then determines if the digital key from the connected host device 414 corresponds to a previously stored digital key. If the digital key from the host device 414 corresponds to the previously stored digital key, the controller 436 generates a control signal to hold the data sync switch 430 in the first state to create a communication link between the second port 426 and the USB hub 462. If the digital key from the host device 414 does not correspond to the previously stored digital key, the controller 436 generates a control signal to hold the data sync switch 430 in the second state to disable data communication between the second port and the USB hub 462.

Figure 9:
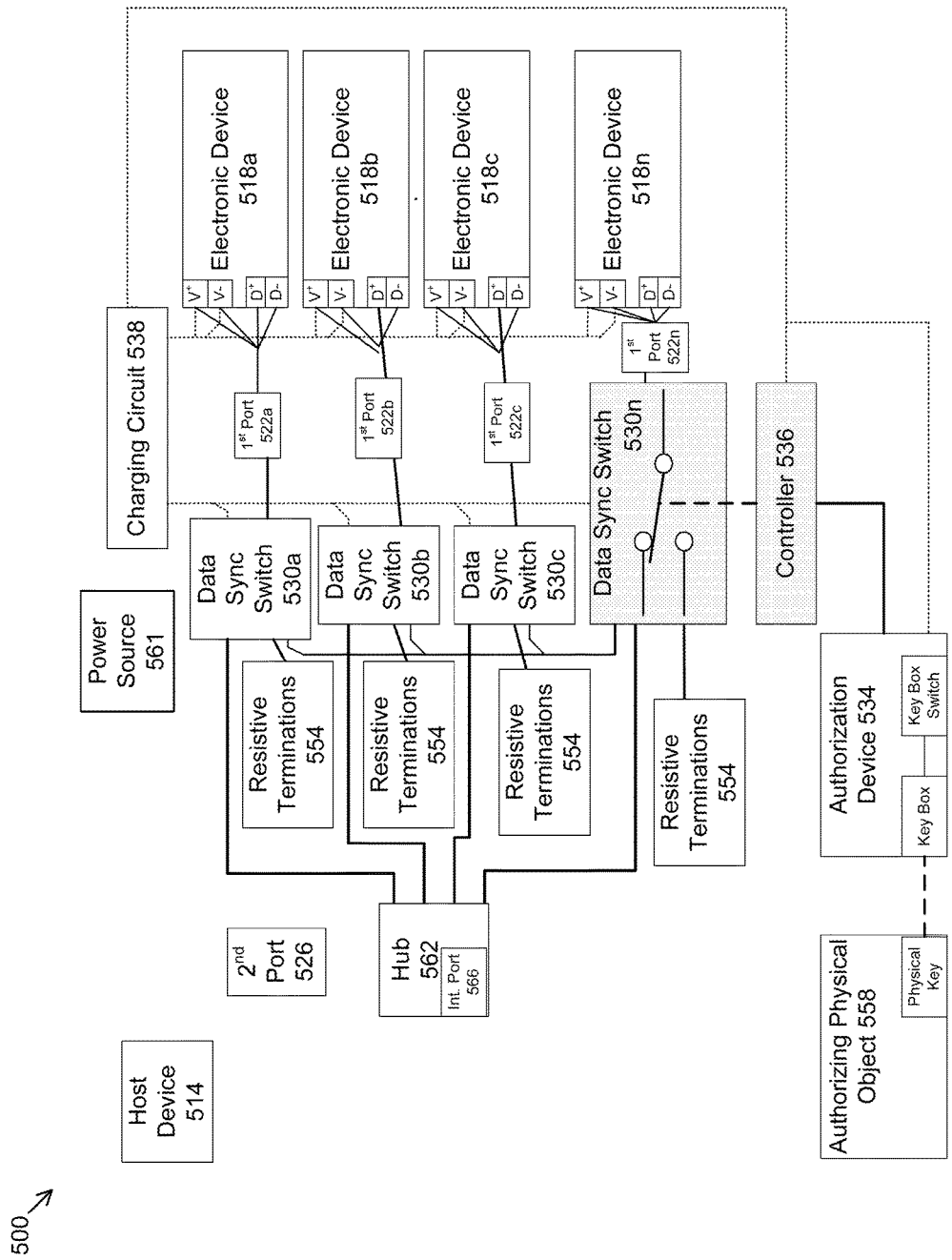
FIG. 9 is a schematic diagram of a data syncing system with a plurality of data sync switches coupled to a plurality of ports that are connectable to a plurality of electronic devices.

In the above examples, a single data sync switch is used to provide (or break) a connection between a number of electronic devices and a host device. However, as illustrated by the example of FIG. 9, a data syncing system can include a plurality of data sync switches that each connect a single electronic device to the host device. The data syncing system 500 includes similar components to the data syncing system 100 and like parts have been given like reference number plus 500. The data syncing system 500 includes a plurality of data sync switches 530a-n. Each data sync switch 530a-n is coupled directly to one of the plurality of first ports 522a-n and to the USB hub 562. The USB hub 562 is coupled to the second port 526. Each data sync switch 530a-n is coupled to the authorization device 534 and changes states based on the output signal from the authorization device 534.

Although the data syncing system 500 includes a plurality of data sync switches 530a-n, in the example of FIG. 9, only one authorization device 534 is needed to enable data communication between the host device 514 and the electronic devices 518a-n. However, in other embodiments, a separate authorization device 534 is used for each data sync switch 530a-n, such that the data communication for each electronic device 518a-n is individually controlled via separate authorization devices 534. In the data syncing system 500, when the authorization device 534 is coupled to the authorizing physical object 558, each of the data sync switches 530a-n receives a control signal to be held in the first state. When the data sync switches 530a-n are in the first state, each data sync switch 530a-n creates a communication link between the USB hub 562 and a respective first port 522a-n. When the data sync switches 530a-n are in the second state, each data sync switch 530a-n connects a respective first port 522a-n to the resistive terminations 554 and thus disconnects the respective first port 522 from the second port 526.

The data syncing system 500 including a plurality of data sync switches 530a-n may include any of the authorization devices 34, 134, 234, 334, and 434 and any of the authorizing physical objects 58, 158, 258, 358, 458, as described above. The data syncing system 500 may be constructed using the cable 69 described with respect to FIG. 4. By connecting the cable 69 between the electronic devices 518a-n and the USB Hub 562, a data sync switch 530 is essentially placed in between the electronic devices 518a-n and the USB Hub 562. This implementation may be useful when upgrading a cabinet used to charge the plurality of electronic devices 518a-n, due to fact that it may be less costly to provide cables including the data sync switch 530, the controller 536, and the authorization device 534, than to provide a new charging/syncing cabinet.

Figure 10:
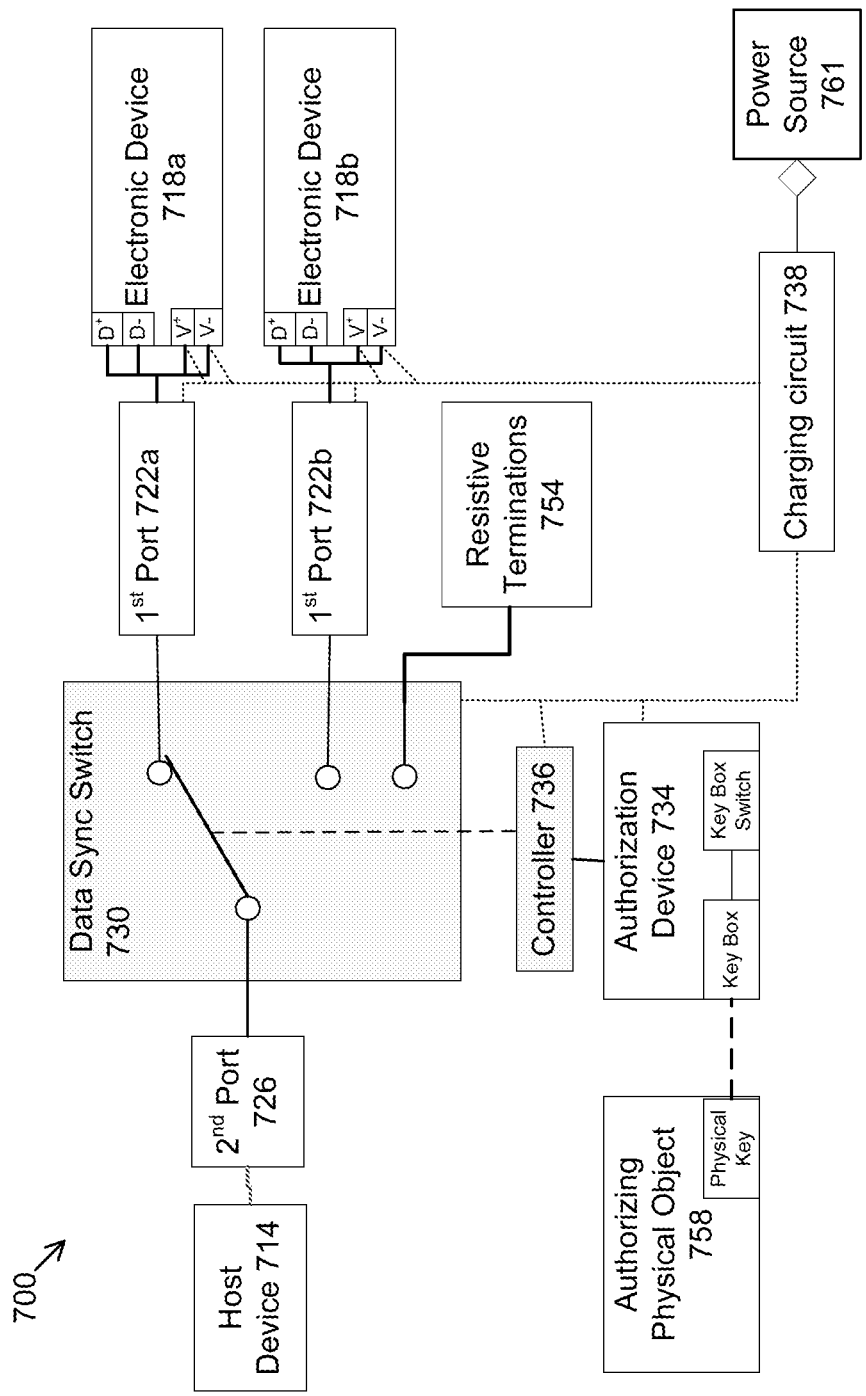
FIG. 10 is a schematic diagram of a data syncing system with a data sync switch that selects specific electronic devices with which to communicate.

In the examples described above in reference to FIGS. 3-9, multiple electronic devices 18a-n can be connected to a single host device 14 at the same time depending on the state of one or more data sync switches 30. However, in other constructions, although multiple electronic devices can be connected to the first ports of the system at the same time, only one connected electronic device is electronically coupled to the host device at any given time. FIG. 10 illustrates an example of one such system. The data syncing system 700 includes a plurality of first ports 722a-b, and a data sync switch 730. The plurality of first ports 722a-b are configured to couple to a plurality of electronic devices 718a-b. In contrast to the data syncing systems 200-600 in which a USB hub was included to simplify the data communication between the host device 14 and the electronic devices 18a-b, the data syncing system 700 does not include a USB hub. Rather, the first ports 722a-b of the data syncing system 700 are directly coupled to the data link switch 730. In the illustrated embodiment, the data sync switch 730 is switchable between a first state, a second state, and a third state.

When the data sync switch 730 is in the first state, the data sync switch 730 connects the second port 726 to the resistive terminations 754 and thus disables data communication between the host device 714 and all of the electronic devices 718a-b. When the data sync switch 730 is in the second state, the data sync switch 730 creates a communication link between the second port 726 and a first electronic device 718a, but data communication between the host device 714 and a second electronic device 718b remains disabled. When the data sync switch 730 is in the third state, the data sync switch 730 creates a communication link between the second port 726 and the second electronic device 718b while disabling data communication between the host device 714 and the first electronic device 718a.

Although the example of FIG. 10 shows a switch that is capable of being positioned in three different states, in other constructions, the data sync switch 730 may be configured to be switchable to four or more states to provide for coupling between even more first ports 722 and the host device 714. Furthermore, although the example of FIG. 10 only provides for communication between the host device 714 and a single electronic device 718 at any given time, in other constructions, the data sync switch 730 may be configured to be switchable to a fourth state in which the data sync switch 730 enables data communication between the host device 714 and the first electronic device 718a and between the host device 714 and the second electronic device 718b at the same time. The data sync switch 730 described above can be used in any of the data syncing systems 10, 100, 200, 300, 400, or 500, and thus other operations of the data syncing system 700 may be substantially the same as those described for any of the above referenced data syncing systems.

Thus, the invention provides, among other things, a data syncing system that uses a physical objet to authorize data communication between a host device and an electronic device. Various features and advantages of the invention are set forth in the following claims.

What is claimed is:

1. A system for enabling data syncing between a host device and an electronic device, the data syncing system comprising:
    a first port selectively coupleable to a first electronic device, the first port including a set of power terminals and a set of data terminals;
    a second port selectively coupleable to the host device;
    a data sync switch coupled between the first port and the second port, the data sync switch switchable between a first state, in which data communication between the electronic device and the host device is enabled, and a second state, in which data communication between the electronic device and the host device is disabled;
    an authorization device configured to
        selectively couple with an authorizing physical object,
        cause the data sync switch to be in the first state when the authorization device is coupled with the authorizing physical object, and
        cause the data sync switch to be in the second state when the authorization device is not coupled with the authorizing physical object; and
    wherein the set of power terminals provides a charging current to the first electronic device when the data sync switch is in the first state and when the data sync switch is in the second state;
    wherein the authorization device includes a transceiver configured to wirelessly communicate with a wireless device, wherein the authorizing physical object includes the wireless device configured to send a signal to the transceiver, and wherein the authorization device and the authorizing physical object are coupled when the signal from the wireless device is recognized by the data syncing system;
    wherein the authorization device is configured to cause the data sync switch to be in the first state, and wherein data synchronization between the host device and the first electronic device continues after the authorizing physical object is decoupled from the authorization device.

2. The system of claim 1, further comprising a charging circuit coupled to a power source and the first port, the charging circuit configured to provide a charging current to the first electronic device.

3. The system of claim 1, wherein the data sync switch is directly coupled to the first port, such that when the data sync switch is in the second state, the first port is electrically disconnected from the second port.

4. The system of claim 1, further comprising a third port configured to be coupled to a second electronic device, and a hub configured to be coupled to the first port and the third port.

5. The system of claim 4, wherein the data sync switch is directly coupled to the hub and to the second port, such that when the data sync switch is in the second state, the second port is electrically disconnected from the hub.

6. The system of claim 1, wherein when the data sync switch is in the first state the first port is electrically connected to the second port, and when the data sync switch is in the second state, the first port is electrically connected to resistive terminations.

7. The system of claim 1, further comprising a third port configured to be coupled to a second electronic device, and wherein the data sync switch is coupled to the first port, the second port, and the third port, the data sync switch switchable between the first state, in which the data sync switch creates an electrical data link between the first electronic device and the host device and the second electronic device is electrically disconnected from the host device, the second state, in which the data sync switch creates an electrical data link between the second electronic device and the host device, and the electrical data link between the first electronic device and the host device is broken, and a third state, in which the electrical data link between the first electronic device and the host device is broken and the electrical data link between the second electronic device and the host device is broken.

8. The system of claim 1, further comprising a controller coupled to the authorization device and the data sync switch, the controller configured to
receive a signal from the authorization device, the signal including information regarding the connection between the authorizing physical object and the authorization device, and
output a control signal to selectively hold the data sync switch in the first state and the second state based on if the authorization device is coupled to the authorizing physical object.

9. The system of claim 1, wherein the data sync switch enables data communication by creating an electrical data link between the first electronic device and the host device, and the data sync switch disables data communication by physically breaking the electrical data link between the first electronic device and the host device.

10. The system of claim 1, wherein the authorization device includes a key box configured to receive a physical key, wherein the physical key is the authorizing physical object, and wherein the authorization device is configured to generate an output signal indicating that the authorization device is coupled with the authorizing physical object when the physical key is inserted into the key box and turned.

11. The system of claim 1, wherein the authorization device includes a port configured to receive a data storage device including a bus interface, wherein the authorizing physical object includes the data storage device, and wherein the data storage device stores a digital key and transmits the digital key to the authorization device.

12. The system of claim 11, wherein the data communication between the first electronic device and the host device is enabled when the digital key is associated with a predetermined digital key stored in the data syncing system.

13. The system of claim 1, wherein the signal from the wireless device includes device identification information, and wherein the wireless device is recognized by the data syncing system when after the device identification information is compared to stored device identification information.

14. The system of claim 1, wherein data synchronization between the host device and the first electronic device stops when one of the host device and the first electronic device is decoupled from the data syncing system.

15. The system of claim 1, further comprising a sync button coupled to the data sync switch, the sync button configured to begin data communication between the first electronic device and the host device after the authorization device has coupled to the authorizing physical object.

16. The system of claim 15, wherein the sync button holds the data sync switch in the first state after the authorizing physical object is decoupled from the authorization device.

17. The system of claim 1, wherein the second port and the authorization device are the same physical structure.

18. The system of claim 1, wherein the second port and the authorization device are separate physical structures.

* * * * *